S. WISNIEWSKI.
RUNNER ATTACHMENT FOR VEHICLES.
APPLICATION FILED JUNE 3, 1915.
1,170,381.
Patented Feb. 1, 1916.
2 SHEETS—SHEET 1.
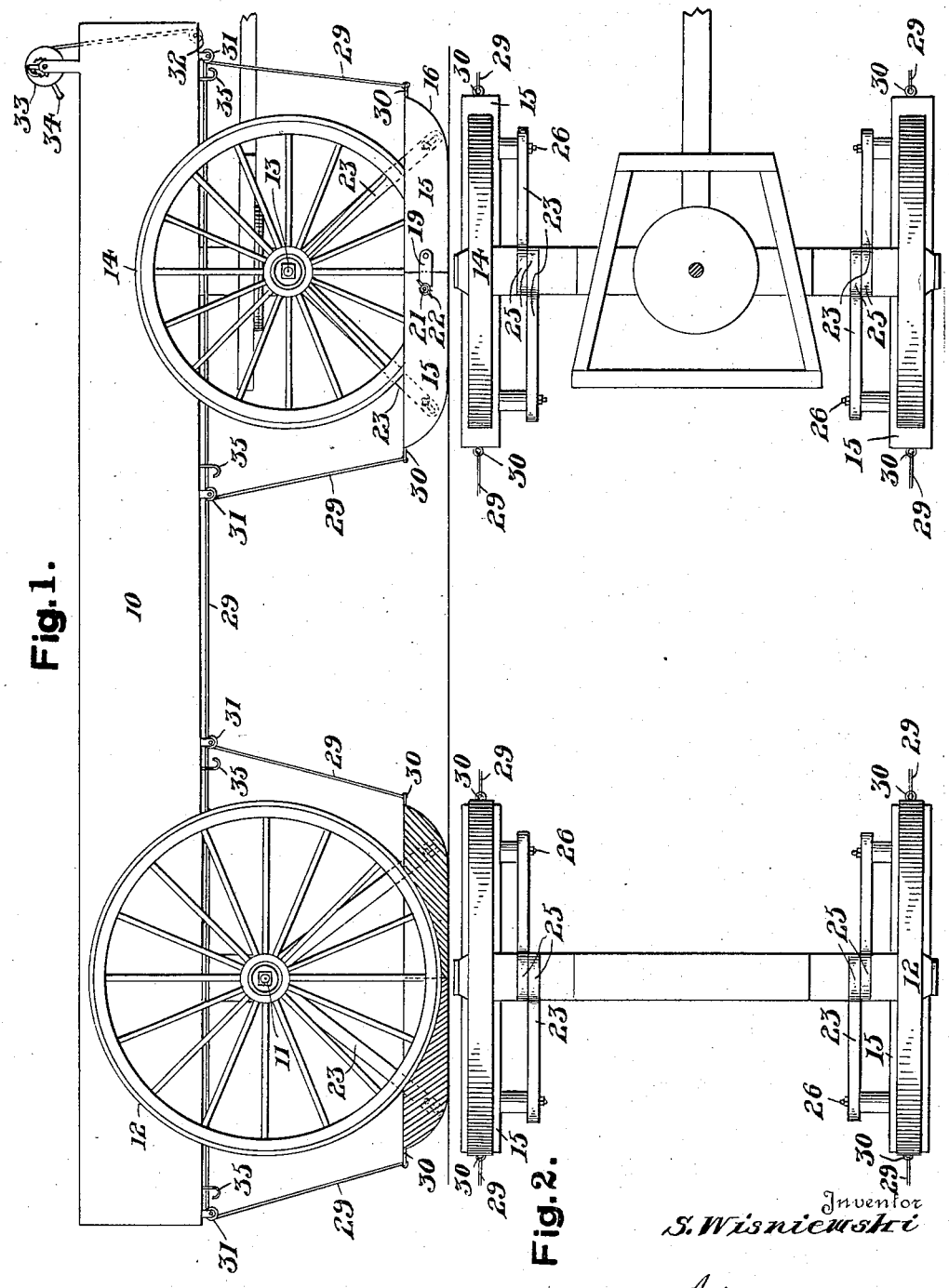
Inventor
S. Wisniewski
By
A. M. Wilson
Attorney S. WISNIEWSKI.
RUNNER ATTACHMENT FOR VEHICLES.
APPLICATION FILED JUNE 3, 1915.
1,170,381.
Patented Feb. 1, 1916.
2 SHEETS—SHEET 2.
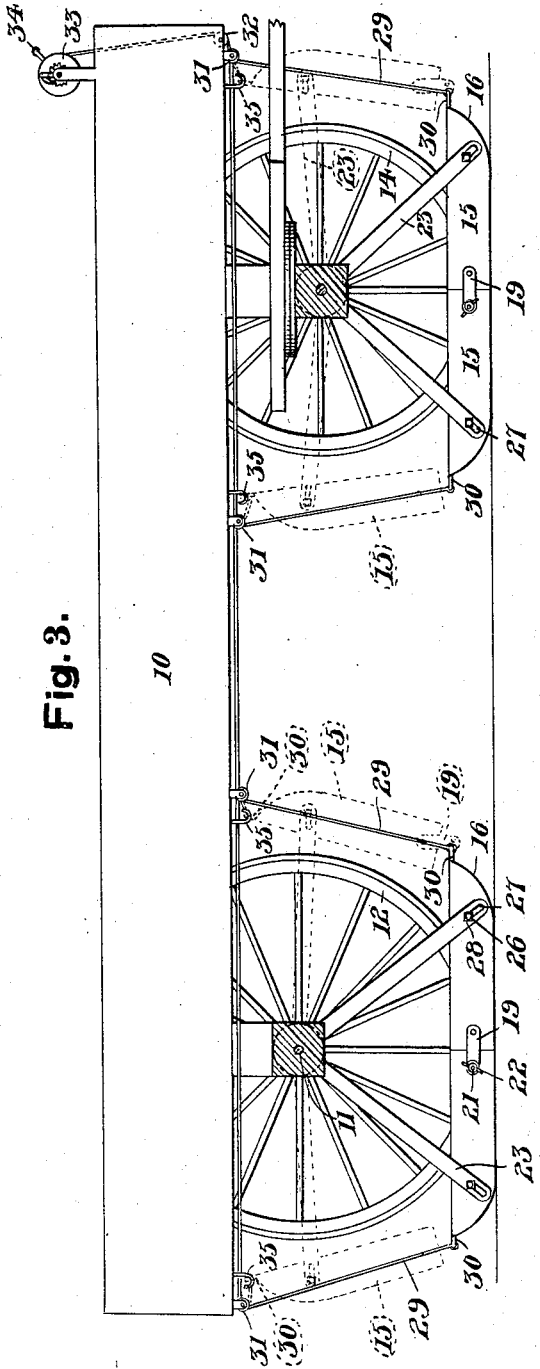
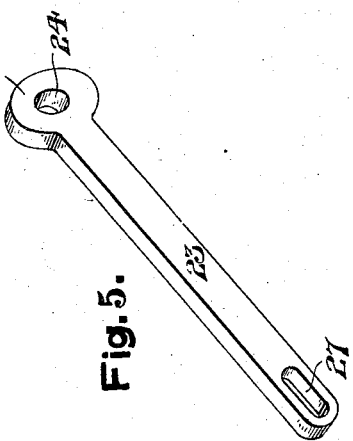
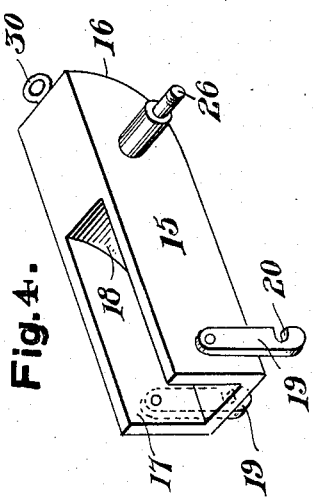
Inventor
S. Wisniewski
By
A. M. Wilson
Attorney

UNITED STATES PATENT OFFICE.

STANISLAW WISNIEWSKI, OF ERIE, PENNSYLVANIA, ASSIGNOR OF ONE-FOURTH TO KAZIMIERZ LUKASZENSKI, OF ERIE, PENNSYLVANIA.

RUNNER ATTACHMENT FOR VEHICLES.

1,170,381.

Specification of Letters Patent. Patented Feb. 1, 1916.

Application filed June 3, 1915. Serial No. 31,867.

*To all whom it may concern:*

Be it known that I, STANISLAW WISNIEWSKI, a citizen of the United States, residing at Erie, in the county of Erie and State of Pennsylvania, have invented certain new and useful Improvements in Runner Attachments for Vehicles, of which the following is a specification.

This invention relates to certain new and useful improvements in runner attachment for vehicles.

The primary object of this invention is the provision of separate attachable sectional runners for the wheels of a vehicle, the same being adapted for being readily positioned for use and easily removed when desired.

A further object of the device is to provide detachable runners for each individual wheel of a vehicle, all of the runners being capable of removal and suspension inoperatively by means controlled adjacent the driver's seat of the vehicle and also operating to simultaneously reposition the runners operatively upon the wheels when found desirable.

A still further object is to provide runners for vehicle wheels which will allow the vehicle to be drawn along thereon in either direction and being serviceable upon snow and ice as well as upon wet and marshy land.

With these general objects in view and others that will appear as the nature of the invention is better understood, the same consists in the novel combination and arrangement of parts hereinafter more fully described, illustrated in the accompanying drawings and pointed out in the appended claims.

In the drawings forming a part of this application and in which like designating characters refer to corresponding parts throughout the several views:—Figure 1 is a side elevation of a vehicle having the present form of runners operatively positioned upon the wheels thereof, one of the runners being shown in longitudinal section. Fig. 2 is a top plan view of the same with the vehicle body removed and parts broken away. Fig. 3 is a view similar to Fig. 1 but with the running gear shown in longitudinal vertical section and the suspended inoperative position of the runner portions being illustrated in dotted lines. Fig. 4 is a perspective view of one of the runner portions, and Fig. 5 is a perspective view of one of the supporting arms.

It will be understood that the detachable runners which form the subject matter of this application are adaptable for all forms of vehicles, the same are herein disclosed in connection with a four-wheeled wagon having a box 10 supported by a rear axle 11 which journals the rear wheels 12 and a front axle 13 upon the opposite ends of which the front wheels 14 are journaled in the usual form of construction.

A runner is provided for each wheel of the vehicle, each of the said runners being formed of two identical runner sections 15 of the form illustrated in Fig. 4 of the drawings. The said runner sections are closed at one curved end 16 thereof and are opened in U-shaped form at the opposite end 16 thus forming a receiving socket for the vehicle wheels, the same to be accommodated upon the curved bottom 18 thereof.

The sections 15 are arranged end-to-end with their opened channeled ends 17 in abutting engagement with each other and thereby accommodating the vehicle wheels in the alining sockets of the two sections as best illustrated in Fig. 1 of the drawings.

Latch connections are arranged between the sections of each runner consisting of pivoted latches 19 having hooks 20 adapted for reception upon pins 21 positioned upon the corresponding face of a coöperating section and adapted to be removably secured thereto by means of winged nuts 22. It will thus be seen that each of the wheels of the vehicle may be readily mounted within a runner and that the vehicle may be drawn along thereon in either direction. A supporting arm 23 is provided for each runner section, the said arms having circular perforations 24 in the head ends 25 thereof and by means of which they are journaled upon the axles 11 and 13. Each runner section is provided with a projecting pin 26, while a slot 27 in the free ends of the arms 23 is adapted to be positioned thereon and adjustably secured in place by means of lock nuts 28.

Operating cords 29 are provided for each runner section, one end of each of the said cords being secured to a terminal ring 30 of the said sections, while the cords extend upwardly and pass over similar pulleys 31 and thence over a vehicle roller 32 to windlass 33 operable by means of a crank 34 which is arranged forwardly of the vehicle body and adjacent the seat thereof.

An engaging hook 35 is arranged substantially above the position of the section rings 30 being secured to the underside of the wagon body 10, it being noted that the arms 23 are positioned inwardly of the runners as best illustrated in Fig. 2.

From this detailed description of the invention, the complete operation thereof will be at once apparent, it being understood that when the vehicle employs its wheels for purposes of locomotion, the runner sections 16 are suspended from the hooks 35 by means of the rings 30 as shown in dotted lines in Fig. 3. At any time when it becomes desirable to employ runners and to attach the same to the forward wheels, the windlass 33 may be turned for winding up the cords 28 slightly thereon, thus tightening the same and pulling the runner section rings 30 off of the supporting hooks 35. By releasing the windlass, the runners will then descend by reason of their own weight into contact with the ground and the slight forward or rearward movement of each wheel will then mount the same upon one of the runner sections, while the coöperating section may be then placed in position and the latches 19 secured for connecting the section together. The lock nuts 28 are then screwed down and the runners are securely positioned beneath the wheels for allowing the vehicle to be drawn along upon the runners. When the runners are no longer desired, the nuts 28 may be loosened and the latches 19 released which will allow the runner sections to be separated and the wheels removed therefrom, whereupon the windlass 33 may be turned for winding up the cords 29 and elevating the sections so that the rings 30 thereof may be readily again engaged with the supporting hooks 35, and when so positioned, the said nuts 28 may be tightened if desired for preventing any swinging movement of the runner sections.

While the form of the invention herein shown and described is what is believed to be the preferred embodiment thereof, it is nevertheless to be understood that minor changes may be made without departing from the spirit and scope of the invention as claimed.

What I claim as new is:—

1. A wheel runner composed of two identical oppositely-arranged sections having alining wheel-receiving sockets therein, pivoting supporting arms pivoted to each of the said sections, and adjustable locking latches connecting the said sections.

2. A device of the class described comprising in combination with wheels of a vehicle, two similar socketed runner sections positioned end-to-end beneath each wheel thereof, supporting arms swingingly mounted in pairs upon the vehicle pivotally connected to the inner faces of the said sections, and latch connections between the said sections.

3. A device of the class described, comprising in combination with wheels of a vehicle, two similar socketed runner sections positioned end-to-end beneath each wheel thereof, supporting arms swingingly mounted in pairs upon the vehicle pivotally connected to the inner faces of the said sections, latch connections between the said sections, hooks carried by the said vehicle above the said sections, rings upon the ends of the sections adapted for engaging the said hooks, pulleys and a windlass carried by the vehicle, and cords operatively secured to the windlass and passing over the said pulleys and having their free ends attached to the said section rings.

In testimony whereof I affix my signature.

STANISLAW WISNIEWSKI.

Copies of this patent may be obtained for five cents each, by addressing the "Commissioner of Patents, Washington, D. C."